2,999,123
SEPARATING PLATES
Ernst Koldehofe, Hannover, Germany, assignor to Continental Gummi-Werke Aktiengesellschaft, Hannover, Germany
Filed Mar. 17, 1958, Ser. No. 721,851
Claims priority, application Germany Mar. 16, 1957
12 Claims. (Cl. 136—145)

The present invention relates to separator plates, especially for accumulators, and a method of making same from glass fibers and synthetic binding means.

The heretofore known separators of glass fibers and synthetic binding means such as polystyrene have generally proved satisfactory, however, for certain purposes the stability or strength of such separators is not sufficient.

It is, therefore, an object of the present invention to provide separators of glass fibers and synthetic binding means, especially for accumulators, which will have an increased strength and stability.

It is also an object of the present invention to provide an improved method of making separators of the above mentioned type.

It is also an object of the present invention to provide separators of glass fibers and synthetic binding means, which will improve the coherence of the ingredients of the separator plates.

Still another object of the present invention consists in the provision of separator plates of glass fibers and synthetic binding means, which will provide an improved protection of the individual glass fibers against the attack of sulphuric acid.

These and other objects and advantages of the invention will appear more clearly from the following specification in connection with the accompanying drawings, in which.

Figure 1:
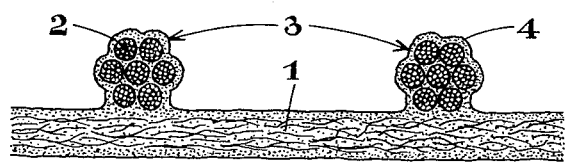
FIG. 1 illustrates a partial section through a separator plate according to the present invention.

The method according to the present invention for providing improved separator plates of glass fibers and synthetic material is characterized primarily in that the glass fibers are impregnated with binding means consisting of a dispersion of polystyrene and ammonium salts of the polymeric acrylic acid, whereupon the thus obtained mixture is formed into a plate-shaped body which latter is then subjected to a heat treatment at a temperature within the range of from 160 to 220° C. for a period of 5 to 60, preferably 30 minutes. Preferably, a temperature of 180° C. has proved highly advantageous in this connection. It is, however, to be understood that the above figures and data are given by way of example only and not by way of limitation.

The ammonium salts of the polymeric acrylic acid in said dispersion have the advantages that they act as thickening means for the dispersion so that a good stability of the crude plate will be obtained so that the dispersion cannot easily flow away again from the glass fibers.

Surprisingly, it has been found that during the heat treatment at approximately 180° C. an additional strength will be obtained. It is assumed that this is due to the fact that during the said heat treatment a further polymerization of the acrylic acid occurs after the ammonium constituents of the salts have evaporated at the increased temperature of approximately 180° C.

This further polymerized polymeric acrylic acid increased the structural strength which was obtained by sintering of the polystyrene. In this connection, it is important for the desired effect that the ammonium salts of the polymeric acrylic acid are employed in a quantity of less than 1% by weight with regard to the quantity of polystyrene. If this were not the case, no evaporation of the ammonium constituents would occur during the heat treatment. If this is the case, i.e. if ammonium salts are employed in excess of 1% by weight, the plate will still be porous but it will not be possible to obtain micropores in the plate. Furthermore, in such an instance, the material of the plate would be subject to attack by sulphuric acid, in other words, the plates would not be usable for employment in accumulators.

According to a further development of the present invention, the separator plates may be provided with ribs of additional strands of glass fibers. These glass fibers may in form of threads or merely bundled be applied to the glass fiber plate provided with binding means. The ribs may be arranged as longitudinal and/or transverse ribs or diagonal ribs on the plates. It is also possible to apply the strands or glass fibers in form of a net upon the plates so that also longitudinal and transverse ribs will be formed.

For purposes of improving the adherence between the glass fibers and the glass fiber plate provided with the binding means, the glas fibers may likewise be treated with a binding means, and preferably with the same binding means, prior to their being deposited upon the plate. This may be carried out in such a way that the glass fiber plate and also the glass fiber strands are immersed into a bath of the same dispersion whereupon the parts to be connected to each other will be so connected while still in wet condition. Due to this preparation, the mutual coherence of the individual glass fibers in the strand will be increased with the result that the strands will become stronger. The thus increased higher strength of the glass fiber strands also increases the strength of the separator plates.

For the adherence it may be sufficient if the glass fibers without being prepared are placed upon the glass fiber plates provided with binding means. It is also possible that the plate and strands of glass fibers are dried subsequent to their immersion and that prior to their interconnection, the contacting surfaces of the respective parts are swelled by a solvent such as toluol whereupon the interconnection of the parts will be effected. The method first mentioned, however, represents the preferred method according to the invention.

The strands of the glass fibers may, for instance, have a thickness of 1.5 millimeters. It is, of course, to be understood that this thickness is given merely by way of example and not by way of limitation and corresponds substantially to the required distance between two electrodes as it was filled in by the heretofore known corrugated separators.

The manufacture of separator plates may also be carried out in such a way that a fiber floss for instance in form of a sheet is impregnated with said dispersion. To this end, it may for instance at the same time as the glass fiber strands be passed through a bath of the above mentioned dispersion, whereupon the excessive dispersion is stripped off and said sheet, if desired after passing through the bath and following the stripping-off step is combined with the glass fiber strands. The thus obtained product is then dried in a drying zone, and subsequently the thus formed crude plate is heat treated by subjecting the same to a temperature of approximately 180° C. At this temperature a sintering of the polystyrene parts will occur. Finally, the plates are cut to the desired size and shape.

In view of the increased structural strength of separator plates according to the present invention, they are advantageously employed for accumulators in vehicles. The simple method according to the invention of making separator plates in combination with the improved strong structure is a further reason for employing separator plates according to the present invention also in stationary accumulators.

Figure 2:
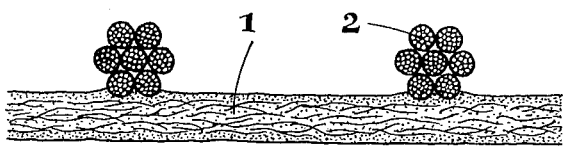
FIG. 2 represents a modification over the arrangement shown in FIG. 1.
Figure 3:
FIG. 3 shows a partial section through another arrangement according to the present invention.

In the drawings the plate 1 comprising glass fibers and a binding means is provided with longitudinal ribs 3 firmly connected to the plate 1 and comprising twisted glass fiber strands 2. The impregnation of the ribs 3 is designated with the reference numeral 4. In conformity with the arrangement of FIG. 2, the binding means or impregnation 4 of FIG. 1 has been omitted. According to FIG. 3 the ribs 3 of FIGS. 1 and 2 have been omitted.

In conformity with a further improvement of the present invention, the employed glass fibers are prior to their impregnation with a binding means formed into a sheet by means of a neutral or substantially neutral substance which brings about the coherence of the parts in said sheet. Advantageously a water non-soluble substance is employed having a pH value between 6 and 8 in order to form the glass fibers into a sheet. Neutral urea resins, such as urea-formaldehyde resins, and neutral polystyrene resins have proved particularly advantageous for this purpose.

The employment of a neutral substance requires a good coherence of the separator plates which will also be maintained after the installation of the plates in the accumulator. This good coherence will be obtained due to the fact that the neutral ingredients in the aqueous medium i.e. in the aqueous hydrosulphuric acid react in a neutral way so that the glass fiber union formed to a sheet will not be dissolved.

Furthermore, due to the presence of the neutral ingredients in the glass fiber sheet, the individual glass fibers will be protected against attack by the sulphuric acid because the glass fibers will at least to their major extent be covered by the neutral synthetic resin and in this way will not at all be exposed to a direct attack by the acid.

The glass fiber sheet when subsequently impregnated with the binding means of a dispersion of polystyrene and ammonium salts of a polymeric acrylic acid sometimes acts in a coagulant manner upon the binding means so that there exists the possibility that separator plates of nonuniform strength may be produced. This drawback has been overcome by forming the glass fibers prior to their impregnation with a binding means to a sheet by means of a neutral or substantially neutral substance as outlined above. This step also prevents an undesired premature chemical deposit of the synthetic dispersion upon the glass fibers.

In view of the above mentioned protective synthetic cover on the glass fibers, there is also obtained the possibility to employ glass fibers in a thickness of less than $15\mu$. In other words, in this way a separator plate may be produced in which a greater number of fibers can be employed per square centimeter than is the case for instance when employing a glass fiber of a thickness of more than $15\mu$, for instance $25\mu$. Due to the said increased number of fibers, the pores of the separator plates become smaller and the safety of operation of such a plate increases. This is due to the fact that the plate will have a more uniform structure, i.e. a better distribution of the pores at a flow speed which is sufficient for the proper passage of the current. At the same time, a non-desired bridge formation between the electrodes is prevented by the sufficiently small micropores.

As dispersion of polystyrene it has been proven particularly advantageous to use a dispersion of 120 parts by weight of water and 100 parts by weight of polystyrene. This dispersion contains also an ammonium salt of a polymeric acrylic acid which is known under the trademark "Latecoll." The above mentioned salt is cited as an example and the present invention is not limited to this particular substance.

If desired the glass fibers are prior to their shaping into a plate impregnated with a dispersion of polystyrene and an ammonium salt of a polymeric acrylic acid. However, the glass fiber plate may preferably first be formed and then be impregnated with the above mentioned dispersion and ammonium salts.

The thickness of the glass fiber plate may be for instance 0.25 to 0.35 millimeter, preferably 0.3 mm. However, the thickness may be varied, if desired.

*Example I*

A preformed glass fiber plate with a thickness of about 0.3 mm. is impregnated with a dispersion of polystyrene at room temperature. The dispersion is composed of 120 parts by weight of water and 100 parts by weight of polystyrene and 1 part by weight of an ammonium salt of a polymeric acrylic acid, known under the trademark "Latecoll." The polystyrene has a particle size of about $2\mu$, for instance. After the removal of the glass fiber plate from the impregnating bath, the superfluous dispersion is removed from the plate with the help of a doctor knife. After this the plate is first dried and then it is sintered. The time for drying and sintering is dependent on the used apparatus. It may vary between 5 minutes and 60 minutes. Preferably 30 minutes are necessary for drying and sintering the plate. The process of drying and sintering may be accomplished in two different zones which are arranged one subsequent to the other. The temperature of the drying zone may vary between 100 and 160° C., and the temperature of the sintering zone may vary between 160 and 220° C., preferably the sintering temperature is approximately 180° C.

It is also possible to accomplish the drying and sintering process within one zone. The temperature is then increased from room temperature to approximately 180° C. and within about 30 minutes, the process is finished.

The weight of the glass fiber plate before its impregnating is about 45 to 50 grams per square meter. After the impregnation the weight of the dried and sintered glass fiber plate is about 200 grams per square meter.

The weight of the finished separator plate is about three times that of the weight of an original glass fiber plate.

If desired, the separator plates may be formed with the help of profiled rollers to get a waved profile. This process is preferably used if the separator plates are produced without additional ribs. The final separator plates show a specific electrical resistance of 0.15 ohm per square centimeter and are well adapted for practical use.

*Example II*

A pre-formed glass fiber plate is prepared with a neutral urea-formaldehyde-resin (carbamide resin) having a pH value between 6 and 8 as a binding means to bring about the coherence of the glass fibers. The quantity of the urea-formaldehyde-resin is approximately 18 percent by the weight of the original glass fiber plate. After this preparation the glass fiber plate is impregnated, dried and sintered as it is described in Example I.

*Example III*

A preformed glass fiber plate with a thickness between 0.25 and 0.35 mm. is prepared with a neutral polystyrene resin having a pH value between 6 and 8, as a binding means to grant a good coherence of the glass fibers. After this the prepared glass fiber plate is dipped into a bath consisting of 100 parts by weight of polystyrene, 120 parts by weight of an aqueous solution containing 3 percent polyvinyl alcohol, and 1 part by weight of an ammonium salt of a polymeric acrylic acid, known under the trademark "Latecoll." The polystyrene which is used in this dispersion has a particle size of approximately $20\mu$, for instance. The drying and sintering of the impregnated glass fiber plate is carried out as described in Example I.

The use of a dispersion containing polystyrene with a particle size of 20μ is more favorable than the use of a polystyrene with a particle size of 2μ, because the pores of the separator may become too small if polystyrene with a particle size of 2μ is used. The specific electrical resistance is also too high if the pores are too small.

By the use of a polystyrene dispersion with a particle size of 20μ, the sintering temperature may already begin at 140° C. in comparison with the begin of the sintering temperature at 160° C. when polystyrene with a particle size of 2μ is used.

*Example IV*

A pre-formed unprepared glass fiber plate is dipped into a bath according to Example I or Example II. After the removal of the superfluous dispersion from the plate additional glass fiber strands are arranged upon the glass fiber plate. Prior to the connection of the strands with the plate, the glass fiber strands may be immersed or not into the same dispersion of polystyrene and an ammonium salt of a polymeric acrylic acid. The additional glass fiber strands are used as ribs on the final separator plate to increase the strength of the separator plate. After the connection of the glass fiber strands with the glass fiber plate the composed body is dried and sintered as it is described in the preceding examples.

*Example V*

A pre-formed glass fiber plate is prepared with a binding means, e.g. an urea-formaldehyde resin or a polystyrene resin having a pH value between 6 and 8. This prepared glass fiber plate is dipped into a bath containing the same substances as described in Example I or Example III. After the removal of the superfluous dispersion from the plate, additional glass fiber strands are connected with the glass fiber plate. Prior to the connection, the glass fiber strands are also treated with the same binding means of a neutral reaction. The thus treated glass fiber strands are then dipped into the same bath which serves also for impregnating the glass fiber plate. After stripping-off the superfluous dispersion from the plate and the strands, the different glass fiber bodies are connected with each other, and the drying and sintering process is subsequently accomplished as it is described in one of the preceding examples.

It is, of course, to be understood that the present invention is, by no means, limited to the particular method and structure described hereinbefore but also comprises any modifications within the scope of the appended claims.

What I claim is:

1. A method of making separator plates of glass fibers and a binding agent, especially for accumulators, which includes the steps of: preforming a glass fiber plate, impregnating the glass fibers of said plate with a dispersion of a binding agent comprising polystyrene and an ammonium salt of a polymeric acrylic acid, and subjecting the thus obtained crude plate to heat of from 160° to 220° C.

2. A method of making separator plates of glass fibers and a binding agent, especially for accumulators, which includes the steps of: preforming a glass fiber plate, impregnating the glass fibers of said plate with a dispersion of a binding agent comprising polystyrene and an ammonium salt of a polymeric acrylic acid in a quantity of less than 1% by weight with regard to the quantity of the employed polystyrene, and subjecting the thus obtained crude plate to heat of from 160° to 220° C.

3. A method of making separator plates of glass fibers and a binding agent, especially for accumulators, which includes the steps of: preforming a glass fiber plate, impregnating the glass fibers of said plate with a dispersion of a binding agent comprising polystyrene and an ammonium salt of a polymeric acrylic acid, providing the thus obtained crude plate with ribs of additional glass fiber strands, and subjecting the thus formed crude plate to heat of from 160° to 220° C.

4. A method of making separator plates of glass fibers and a binding agent, especially for accumulators, which includes the steps of: preforming a glass fiber plate, impregnating the glass fibers of said plate with a dispersion of a binding agent comprising polystyrene and an ammonium salt of a polymeric acrylic acid, providing the thus obtained crude plate with ribs of additional glass fiber strands, impregnating said additional strands of glass fibers with said binding agent, depositing the thus treated additional strands on the crude glass fiber plate so as to cause said additional strands to form ribs on said glass fiber plate, and subjecting the thus obtained crude plate to heat of from 160° to 220° C.

5. A method of making separator plates of glass fibers and a binding agent, especially for accumulators, which includes the steps of: preforming a glass fiber plate, mixing glass fibers of said plate with a neutral synthetic resin, shaping the thus obtained mixture into a sheet of a desired size, impregnating the thus formed plate with a dispersion of a binding agent comprising polystyrene and an ammonium salt of a polymeric acrylic acid, and subjecting the thus treated plate to heat of from 160° to 220° C.

6. A method of making separator plates of glass fibers and a binding agent, especially for accumulators, which includes the steps of: preforming a glass fiber plate, mixing glass fibers of said plate with a neutral synthetic resin having a pH value of from 6 to 8, shaping the thus obtained mixture into a sheet of a desired size, impregnating the thus formed plate with a dispersion of a binding agent comprising polystyrene and an ammonium salt of a polymeric acrylic acid, and subjecting the thus treated plate to heat of from 160° to 220° C.

7. A method of making separator plates of glass fibers and a binding agent, especially for accumulators, which includes the steps of: preforming a glass fiber plate, mixing glass fibers of said plate with a neutral urea resin, shaping the thus obtained mixture into a sheet of a desired size, impregnating the thus formed plate with a dispersion of a binding agent comprising polystyrene and an ammonium salt of a polymeric acrylic acid, and subjecting the thus treated plate to heat of from 160° to 220° C.

8. A method of making separator plates of glass fibers and a binding agent, especially for accumulators, which includes the steps of: mixing glass fiber with a neutral polystyrene resin, shaping the thus obtained mixture into a sheet of a desired size, impregnating the thus formed plate with a dispersion of a binding agent comprising polystyrene and an ammonium salt of a polymeric acrylic acid, and subjecting the thus treated plate to heat of from 160° to 220° C.

9. As an article of manufacture: a separator plate, especially for accumulators, said plate comprising the product obtained by preforming a glass fiber plate, impregnating said glass fiber plate with a dispersion of polystyrene containing a quantity less than 1% by weight, with regard to the quantity of said polystyrene, of an ammonium salt of a polymeric acrylic acid, and subjecting the thus formed and impregnated plate to heat of from 160° to 220° C.

10. As an article of manufacture: a separator plate, especially for accumulators, said plate comprising the product obtained by mixing glass fibers with a synthetic resin having a pH value of from 6 to 8, shaping the thus obtained mixture into a sheet of desired size, impregnating the thus formed glass fiber plate with a dispersion of polystyrene containing a quantity less than 1% by weight, with regard to the quantity of said polystyrene, of an ammonium salt of a polymeric acrylic acid, and subjecting the thus formed and impregnated plate to heat of from 160° to 220° C.

11. As an article of manufacture: a separator plate, especially for accumulators, said plate comprising the product obtained by mixing glass fibers with a substantially neutral urea resin, shaping the thus obtained mixture into a sheet of desired size, impregnating the thus formed glass fiber plate with a dispersion of polystyrene containing a quantity less than 1% by weight, with regard to the quantity of said polystyrene, of an ammonium salt of a polymeric acrylic acid, and subjecting the thus formed and impregnated plate to heat of from 160° to 220° C.

12. As an article of manufacture: a separator plate, especially for accumulators, said plate comprising the product obtained by preforming a glass fiber plate, impregnating said glass fiber plate with a dispersion of polystyrene containing a quantity less than 1% by weight, with regard to the quantity of said polystyrene, of an ammonium salt of a polymeric acrylic acid, providing said glass fiber plate with ribs of additional glass fibers, and subjecting the thus formed and impregnated plate to heat of from 160° to 220° C.

References Cited in the file of this patent

UNITED STATES PATENTS

| | | |
|---|---|---|
| 1,938,982 | Smith | Dec. 12, 1933 |
| 2,374,540 | Hall | Apr. 24, 1945 |
| 2,504,744 | Sproull et al. | Apr. 18, 1950 |
| 2,566,960 | Philipps | Sept. 4, 1951 |
| 2,578,534 | Giles et al. | Dec. 11, 1951 |
| 2,624,768 | Toulmin | Jan. 6, 1953 |
| 2,653,986 | Philipps | Sept. 29, 1953 |
| 2,664,376 | Philipps | Dec. 29, 1953 |